(12) United States Patent
Perissinotto

(10) Patent No.: US 8,512,184 B2
(45) Date of Patent: Aug. 20, 2013

(54) TENSIONING DEVICE WITH RESTRAINT SYSTEM

(75) Inventor: Renzo Perissinotto, Dachau (DE)

(73) Assignee: Iwis Motorsysteme GmbH & Co. KG, Munich (DE)

( * ) Notice: Subject to any disclaimer, the term of this patent is extended or adjusted under 35 U.S.C. 154(b) by 545 days.

(21) Appl. No.: 12/849,639

(22) Filed: Aug. 3, 2010

(65) Prior Publication Data

US 2011/0028253 A1 Feb. 3, 2011

(30) Foreign Application Priority Data

Aug. 3, 2009 (DE) .................. 10 2009 035 923

(51) Int. Cl.
*F16H 7/12* (2006.01)

(52) U.S. Cl.
USPC .......................................... 474/135

(58) Field of Classification Search
USPC .................................. 474/135, 110
See application file for complete search history.

(56) References Cited

U.S. PATENT DOCUMENTS

| | | | |
|---|---|---|---|
| 2,210,276 A | | 8/1940 | Bremer |
| 3,081,643 A | | 3/1963 | Huboi et al. |
| 4,792,322 A * | 12/1988 | Goppelt et al. ............. 474/136 |
| 5,030,169 A | | 7/1991 | Kiso et al. |
| 5,649,878 A | | 7/1997 | Noguchi et al. |
| 5,967,921 A * | 10/1999 | Simpson et al. ............. 474/110 |
| 5,989,129 A | | 11/1999 | O'Neill |
| 5,989,139 A * | 11/1999 | Dusinberre et al. ......... 474/110 |
| 6,120,402 A * | 9/2000 | Preston et al. ............... 474/109 |
| 6,126,563 A * | 10/2000 | Simpson ...................... 474/110 |
| 6,244,981 B1 * | 6/2001 | Simpson ...................... 474/110 |
| 7,189,174 B2 * | 3/2007 | Yamamoto et al. ......... 474/109 |
| 7,775,921 B2 * | 8/2010 | Izutsu et al. ................. 474/110 |
| 2003/0008738 A1 * | 1/2003 | Rossato et al. .............. 474/110 |
| 2006/0003859 A1 * | 1/2006 | Sato et al. ................... 474/110 |
| 2006/0281595 A1 * | 12/2006 | Narita et al. ................ 474/109 |
| 2006/0293133 A1 | 12/2006 | Simpson |
| 2007/0054767 A1 | 3/2007 | Yamada |
| 2010/0222167 A1 * | 9/2010 | Chekansky et al. .......... 474/110 |
| 2012/0040790 A1 * | 2/2012 | Perissinotto et al. ......... 474/110 |

FOREIGN PATENT DOCUMENTS

| | | |
|---|---|---|
| DE | 1650620 | 1/1970 |
| DE | 1815228 | 6/1970 |
| DE | 3249504 A1 | 5/1984 |
| DE | 19538401 A1 | 12/1996 |
| DE | 10014700 A1 | 10/2001 |
| DE | 102006028988 A1 | 1/2007 |
| EP | 0106325 A1 | 4/1984 |
| JP | 06094089 A2 | 4/1994 |
| JP | 11072148 A | 3/1999 |
| JP | 2007170457 A2 | 7/2007 |
| WO | 9210838 A1 | 6/1992 |
| WO | 2009/015174 A1 | 1/2009 |

* cited by examiner

*Primary Examiner* — William A Rivera
*Assistant Examiner* — Michael Riegelman
(74) *Attorney, Agent, or Firm* — Baker & Hostetler LLP

(57) ABSTRACT

A tensioning device for a flexible driving means, in particular a chain tensioner for a timing chain of an internal combustion engine, with a housing, a tensioning piston guided in a piston bore of the housing and a latching element arranged outside on the housing, is provided. A latching profile is provided on the front region of the tensioning piston in the tensioning direction. The latching element has at least one spring arm protruding over the housing in the tensioning direction, which engages the latching profile of the tensioning piston outside of the housing. The latching element for the delimitation of the free working range between a front end-stop and a rear end-stop in and against the tensioning direction is arranged movably on the housing.

11 Claims, 5 Drawing Sheets

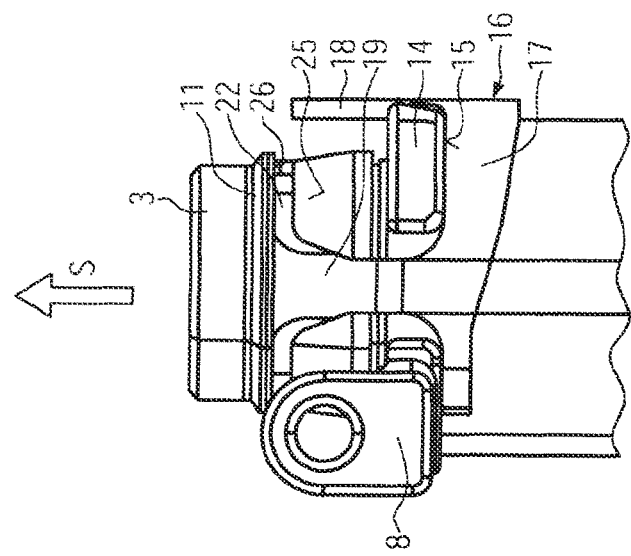
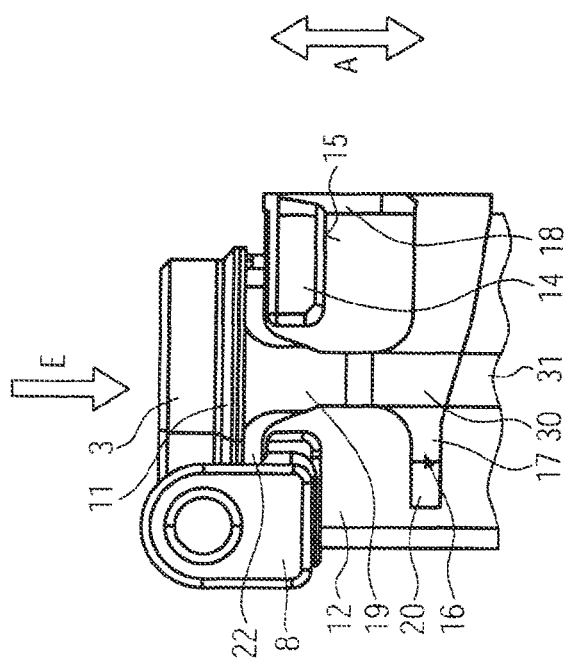

TENSIONING DEVICE WITH RESTRAINT SYSTEM

CROSS-REFERENCE TO RELATED APPLICATIONS

This application claims priority to Foreign Patent Application DE 10 2009 035923.0, filed on Aug. 3, 2009, the disclosure of which is incorporated herein by reference in its entirety.

FIELD OF THE INVENTION

The present invention relates to a tensioning device for a flexible driving means, in particular a timing chain of an internal combustion engine, with a housing, a tensioning piston guided in a piston bore of the housing and a latching element arranged outside on the housing, whereby the tensioning piston is provided with a latching profile on the front section of the tensioning piston in the tensioning direction and the latching element has at least one spring arm protruding over the housing in the tensioning direction, the said arm engaging the latching profile of the tensioning piston outside of the housing.

BACKGROUND OF THE INVENTION

Piston-actuated tensioning devices of this nature with a restraint system are very common and are used in particular on internal combustion engines. The associated housing, together with a hollow cylindrical tensioning piston in the piston bore of the housing, forms a pressure cavity, which is normally filled with a hydraulic medium and in which a compression spring is arranged to tension the tensioning piston. Often tensioning devices of this nature have restraint systems in the form of latching mechanisms, which define a blocking and a slide-through direction for the tensioning piston, whereby retraction of the tensioning piston into the housing from a certain end-stop is prevented, but re-adjustment of the tensioning function is possible. A tensioning device of this nature is known, whereby the tensioning piston is provided with a sawtooth profile in which a ratchet block engages through a housing window. With this tensioning device the free working range of the tensioning piston is defined by the axial movement of the ratchet block in the housing window.

Tensioning devices with latching arrangements for limiting the inward movement of the piston and the simultaneous definition of a free working range of the tensioning device are very common and have been well-proven in use. However, a disadvantage with these tensioning devices is the complex structure which demands increased effort during the individual manufacture of the components and during the assembly, therefore implying higher costs.

At least one generic tensioning device is known. The tensioning piston of this hydraulic tensioner has a sawtooth profile in which two flexible latching arms of a latching element are clipped onto the housing from outside engage. Between the individual protrusions of the sawtooth profile larger distances are provided which define the free working range of the piston connected to the latching element, thus facilitating an axial movement of the tensioning piston with respect to the latching element along the free working range. When the tensioning piston enters the next latching point of the sawtooth profile, the rigid gradations due to the individual protrusions of the sawtooth profile and their spacing for provision of the free working range cause an abrupt increase in the forces acting on the flexible driving means. Consequently, only a smaller inward displacement into the piston bore remains, which is why no optimum damping against shocks and vibrations due to the driving means is available. The last groove of the sawtooth profile is formed as a stepped groove for limiting the maximum axial outward movement of the tensioning piston. With this tensioning device the working range of the tensioning piston, limited by the spacing of the individual protrusions of the sawtooth profile, was consequently found to be disadvantageous. Also in the contact region between the latching arms and the sawtooth profile of the tensioning piston and, due to the continuous axial movement of the piston in and against the tensioning direction, wear on the components of the latching arrangement occurs which can affect its operation.

SUMMARY OF THE INVENTION

In view of the disadvantages of the tensioning devices known from the state of the art, one aspect of the present invention optimizes the functioning principle of a generic tensioning device, in particular to achieve an adequate damping behavior with a reliable adjusting function. A latching element for the delimitation of the free working range between a front end-stop and a rear end-stop in and against the tensioning direction is arranged movably outside of the housing.

The latching element arranged on the housing is movable in the direction of the axis of the tensioning piston, i.e. in and against the tensioning direction of the piston, whereby the front and rear end-stops limit the axial movement of the latching element and via their positioning they define the free working range of the tensioning piston with respect to the latching profile of the tensioning piston. The latching element thus directly participates in the two principal functions of the restraint system, the provision of a free working range and blocking of the inward movement of the piston. Furthermore, the latching element is merely externally arranged on the housing. In the housing neither additional openings nor any complicated processing is needed for the accommodation of the latching element and for the implementation of the functions. Since also no interaction is necessary with the housing, the latching element can optionally be arranged, for example clipped on, only after assembly of the actual tensioning device. The simple construction of the housing and the lack of complex processing for the arrangement of the latching element enables the housing to be manufactured independently of the subsequent application and to be used for tensioning devices with and without restraint systems. The actual tensioning devices can thus be already finally assembled and quickly retrofitted with a latching element as required if the customer desires a tensioner with a restraint system.

For a uniform distribution of the latching forces acting over the latching profile onto the tensioning piston and of the tensioning forces of the drive to be transferred via the latching element onto the housing during an excessively strong inward movement of the tensioning piston, the latching element can have two spring arms protruding over the housing in the tensioning direction. Here, the spring arms can be formed with radially inwards orientated latching hooks for reliable engagement in the latching profile of the tensioning piston.

Preferably, the latching element can be formed as a sectionally open, flexible clip element, in particular in spring steel. Apart from the simple manufacture of this latching element designed as a single part, a flexible clip element, open on one side, in particular with an oval or omega-shaped contour, facilitates a very simple clip-on installation. Due to the flexible formation of the latching element, in particular in spring steel, possible damage to the latching element and to the housing when clipping on the latching element is avoided. The arrangement of the latching element around the housing enables transfer of the tensioning and piston forces in the restraint system with only a slight radial component. This transfer with little or no side forces reduces the risk of the latching element jamming during its axial movement in and against the tensioning direction on the housing.

In a further embodiment of the tensioning device an anti-twist device is provided. The anti-twist device provides radial guidance of the latching element on the housing and thus facilitates the optimum arrangement of the front and rear end-stops for the transfer of the forces from the latching element to the housing. Here, the anti-twist device can have a ridge on the latching element protruding in the tensioning direction for the reliable guidance of the latching element. The ridge, the axis of which runs parallel to the piston axis, can here be radially guided by means of an appropriate guide on the housing, which, for example, can be formed by the front and/or rear end-stop. Furthermore, the anti-twist device can have at least one guide section arranged on the housing in the longitudinal direction, by means of which radial guidance of the latching element is possible without additional elements or other shapes that consume material being provided on the latching element itself. Preferably, this guide section is formed as a simple flattened section on the housing, but ridges or indentations in the housing pointing outwards are also possible. To improve the anti-twist protection and the radial guidance of the latching element, the guide section arranged in the longitudinal direction can interact with an appropriate complementary shaped section on the latching element.

A preferred embodiment provides for the front end-stop having at least one stop block and the stop block adjacent to the face side of the housing protrudes radially with respect to the housing. Despite the simple construction, an stop block of this nature on the tension side facilitates a reliable delimitation of the forwards movement of the latching element on the housing. Thus the stop block in conjunction with the latching element also forms the front delimitation, in the tensioning direction, of the free working range of the tensioning piston. To prevent an excessive or one-sided stressing of the stop block and to restrict the wear due to it, the front end-stop can have two stop blocks, preferably four stop blocks. To simplify the construction and the geometrical shape the at least one stop block can also form the rear end-stop. Alternatively, an embodiment of the rear end-stop by means of protrusions on the housing body is also possible, which however requires an increased amount of materials.

A modification of the tensioning device provides for the housing having a housing shank on which the latching element is movably arranged. A housing shank of this nature offers a simple solution of securely arranging the latching element on the housing and of simultaneously realizing a high level of movability and guidance of the latching element. Here the housing shank can be formed purely constructively without any additional manufacturing effort with respect to the rest of the housing body that is provided with connecting elements, whereby the housing shank is arranged on the front section of the housing in the tensioning direction to reduce the length of the spring arm. The diameter of the housing shank can remain the same or change with respect to the main shape of the housing. A change of diameter with respect to the rest of the housing body can be used here for the constructive formation or support of the end-stops.

An expedient embodiment of the tensioning device provides for the latching profile on the tensioning piston being formed as a sawtooth profile, preferably as a circumferential sawtooth profile. The embodiment of the latching profile with saw teeth facilitates a simple and at the same time reliable solution in an axial movement direction (in the tensioning direction) of enabling the tensioning piston to slide through with respect to the latching element acting on the latching profile, whereas in the other direction (against the tensioning direction) the latching function is fully effective and piston movement into the piston bore of the housing is prevented.

In order to position the tensioning piston securely with respect to the latching element, the latching hook, aligned radially inwards on the at least one spring arm, can fill out the region between a ramp of a saw tooth and an abutment flank of a preceding saw tooth of the sawtooth profile in the axial direction. The positive-locking accommodation of the latching hook between the saw teeth prevents or reduces a relative movement between the latching element and tensioning piston and thus reduces wear on the latching hook as well as deterioration of the latching effect associated with it. Here, the latching hook can either only fill out the region of the circumferential section of the sawtooth profile between a ramp and a preceding abutment flank or can be formed with an additional section corresponding to the foot of the ramp.

A further embodiment provides for the face side of a latching hook, aligned radially inwards on the at least one spring arm, having a radius to the longitudinal axis of the tensioning piston which is greater than the outer radius of the tensioning piston. The larger radius of the latching hook face side facilitates easier snag-free sliding over the tooth tips of the sawtooth profile which have the same diameter or radius as the external circumference of the tensioning piston. With a smaller radius the sideward tips of the latching hook would remain caught behind the tooth tips or the spring arm would have to be bent-up further radially outwards, so that the latching ring can skip over into the next step of the latching profile during an outward movement of the tensioning piston. Due to the larger radius of the latching hook face side, the latching hook itself can be formed wider, so that a larger stopping face is available to improve the distribution of the forces arising on stopping during the inward movement.

Another aspect of the present invention also extends to the use of a housing for a tensioning device with a piston bore and a region for a latching element, which can be arranged from outside on the housing between a front end-stop and a rear end-stop, in one of the embodiments described above of a tensioning device for a flexible driving means, in particular in a chain tensioner for a timing chain of an internal combustion engine.

Furthermore, the present invention relates to the use of a housing for one of the above described embodiments of a tensioning device, comprising a piston bore and a region for a latching element, which can be arranged on the housing from outside between a front end-stop and a rear end-stop, in a tensioning device without a latching element arranged on the housing from outside, whereby a tensioning piston of the tensioning device is formed with or without a latching profile. An embodiment of a latching element arranged on the housing, movable from the outside, which engages the latching profile of the tensioning piston by means of at least one spring arm protruding over the housing and fixes the tensioning piston with respect to the latching element, facilitates the use of the associated housing in a product series of tensioning devices with and without a restraint system. Since the operation and the actual tensioning function of the tensioning device remain completely uninfluenced by the latching element arranged on the housing from outside, the use of the same components, in particular the housing and possibly the tensioning piston, is facilitated in a simple tensioning device without restraint system. Furthermore, tensioning devices with a housing formed for the external arrangement of the latching element and a tensioning piston with a latching profile without a corresponding latching element can be prefabricated, capable of functioning and ready for transport, and can be retrofitted with a latching element in line with requirements or for certain batches. In this way tensioning devices of closely similar construction can be made available with and without restraint system, whereby construction costs in the engine development and conversion costs for special engine variants can be reduced.

BRIEF DESCRIPTION OF THE DRAWINGS

A tensioning device according to various embodiments of the present invention is explained in more detail below and is illustrated in the following drawings:

FIG. 4a depicts a side view of the restraint system of the tensioning device from FIG. 1 in a completely retracted state;

FIG. 4b depicts a side view of the restraint system of the tensioning device from FIG. 1 in a completely extended state.

DETAILED DESCRIPTION

Figure 1:
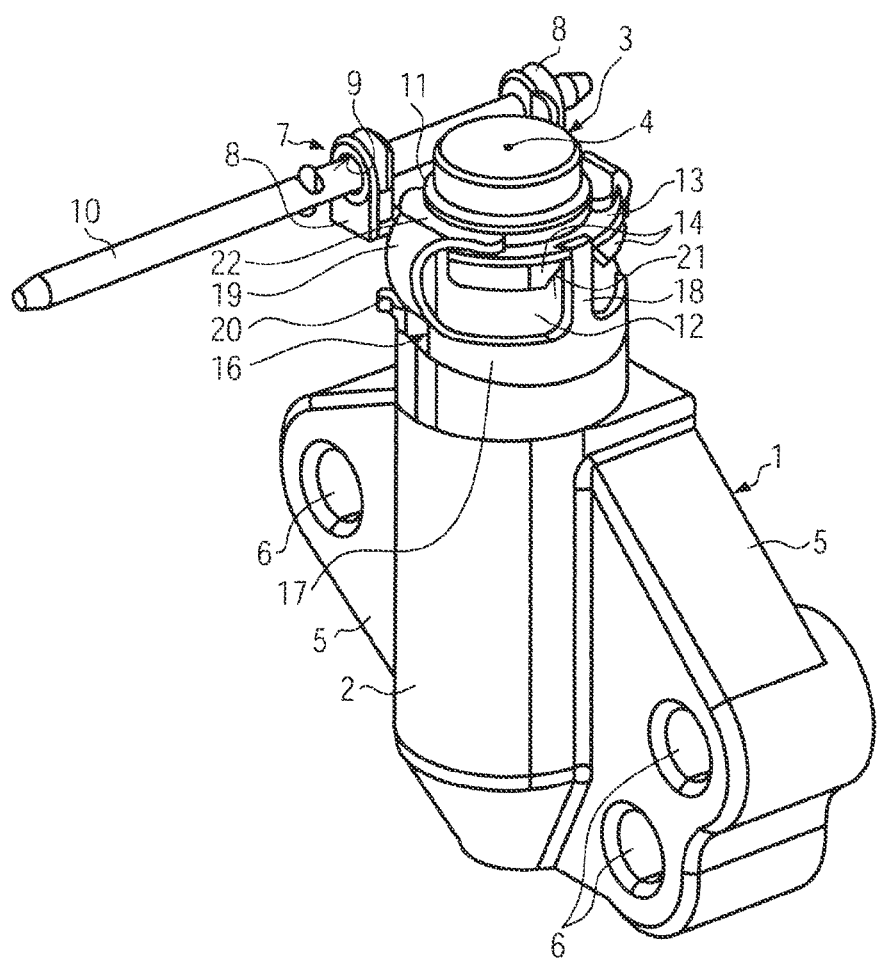
FIG. 1 depicts a perspective view of a tensioning device with restraint system according to an embodiment of the present the invention.

In FIG. 1, a tensioning device according to an embodiment of the present invention, in which a restraint system is illustrated, is formed as a chain tensioner for the timing chain drive of an internal combustion engine. The chain tensioner comprises a housing 1 with a hollow cylindrical housing body 2, in which a similarly hollow cylindrical tensioning piston 3 is guided for longitudinal movement. The hollow cylindrical housing body 2 and the tensioning piston 3 together form a pressure cavity, which is connected via a non-return valve to a hydraulic device. Here, the tensioning piston 3 is normally tensioned in the axial direction by a screw-shaped compression spring and, in the direction of the axis of the tensioning piston 3, presses against a timing chain, which is not illustrated, of an internal combustion engine. A vent hole 4 is provided on the face side of the tensioning piston 3 for venting the pressure cavity and to provide a leakage flow of the hydraulic medium. The housing 1 is realized as a flanged housing with sideward mounting flanges 5 and bolt holes 6 for fitting the chain tensioner on the engine block. Furthermore, an embodiment of the housing 1 as a screw-on housing is also possible, whereby the cylindrical housing body 2 is then provided with an external thread. On the front end of the housing 1 in the tensioning direction a transport securing device 7 is also provided, consisting of two securing lugs 8 with securing eyes 9 and a removable securing bolt 10, which interacts with a securing protrusion 11 on the tensioning piston for fixing the tensioning piston 3 in the transport position and holds the tensioning piston in a completely retracted position in the housing 1. Here, the securing bolt 10, introduced and held in the securing eyes 9 above the securing protrusion is arranged with respect to the tensioning piston 3 such that the securing bolt 10 coincides with the securing protrusion 11.

On the end of the housing 1 in the tensioning direction a housing shank 12 is provided on which the latching element 16 is arranged for axial movement. Compared to the remainder of the connecting housing body 2, the housing shank 12 has essentially the same shape and diameter. The housing shank 12 can, similar to the rest of the housing body 2, be formed ovally or eccentrically in order to accommodate a correspondingly shaped latching element. Here, the housing shank 12 and the housing body 2 can both be formed offset to the axis of the tensioning piston 3. Adjacent to the face side 13 of the housing 1 stop blocks 14 are provided, which protrude radially with respect to the surface shell of the housing shank 12.

The latching element 16 is arranged for axial movement on the housing shank 12. The latching element 16 consists of a clip element 17 open on one side, a guide ridge 18 and two spring arms 19. On the open end of the clip element 17 mounting tips are provided which are bent outwards. The guide ridge 18 extends centrally from the clip element 17, i.e. oppositely situated to the opening of the clip element 17, with its axis parallel to the longitudinal axis and in the tensioning direction of the tensioning piston 3. Here the guide ridge 18 is radially guided through a guide opening 21 between the two stop blocks 14 which are situated opposite the transport securing device 7. The spring arms 19 arranged at 90° to the guide ridge 18 and offset on the clip element 17 also protrude from the clip element 17 in the tensioning direction of the tensioning piston 3, whereby, to improve the spring function, they are initially bent convexly outwards before they again run above the face side 13 of the housing 1 in the direction of the tensioning piston 3. Furthermore, the spring arms 19 which are bent outwards, facilitate the engagement of a tool between the convex section of the spring arm 19 and the housing shank 12 or the tensioning piston 3 in order to counter the tension in the spring arms 19 and to facilitate release of the latching element 16. In the region of the section of the spring arm 19 engaging the tensioning piston 3, the spring arm 19 widens to arc-shaped latching hooks 22 located radially to the tensioning piston 3.

Figure 2:
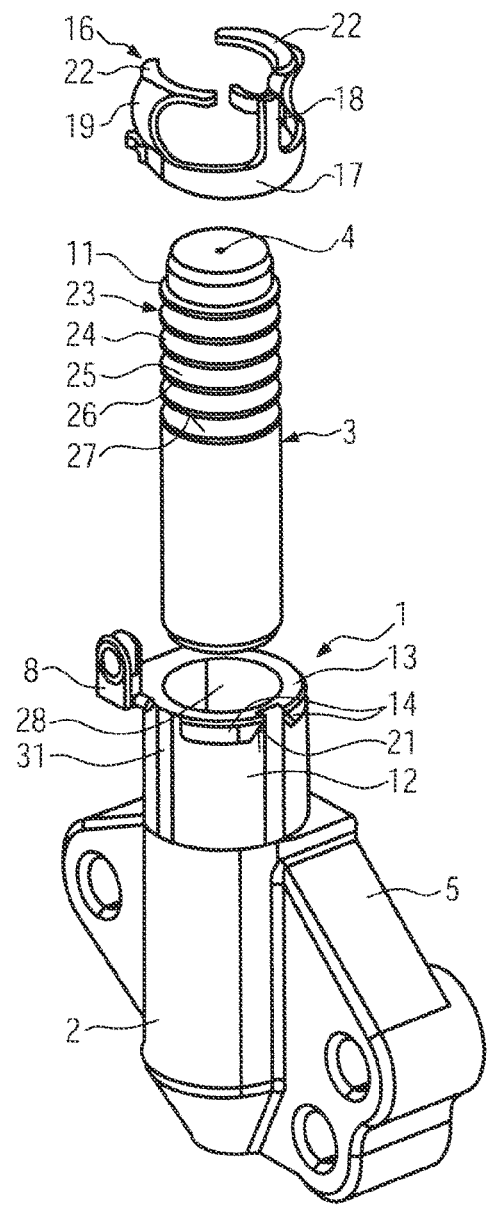
FIG. 2 depicts an exploded view of the tensioning device from FIG. 1.

The arc-shaped latching hooks 22 of the latching elements 16 are tensioned by the convexly bent spring arms 19 with respect to the latching profile 23 of the tensioning piston 3. As illustrated in the exploded view of the chain tensioner in FIG. 2, the latching profile 23 is formed on the front end of the tensioning piston 3 in the tensioning direction, starting directly below the securing protrusion 11. The latching profile 23 is formed as a sawtooth profile and consists of a row of saw teeth 24 mutually arranged around the cylindrical tensioning piston 3. On the side facing the tensioning face side of the tensioning piston 3 the saw teeth 24 have a sloping ramp 25, which with a disengaging movement of the tensioning piston 3 causes the spring arms 19 located over the latching hooks 22 on the latching profile 23 to splay out in the radial direction and enables the latching hooks 22 to slide over the saw teeth 24 into the next tooth space 26. On the side of the saw teeth facing away from the face side of the tensioning piston 3 an abutment flank 27 is provided essentially running perpendicular to the piston axis and with an engaging movement of the tensioning piston 3 into the housing bore 28 of the housing 1 prevents the tensioning piston 3 sliding through with respect to the latching element 16.

Figure 3A:
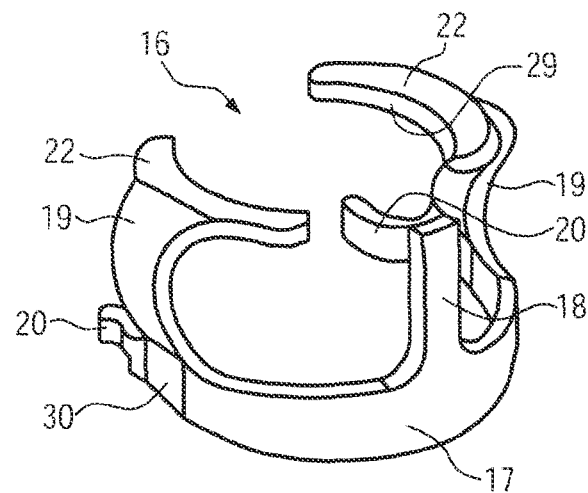
FIG. 3a depicts a perspective detail view of the latching element from FIGS. 1 and 2.
Figure 3B:
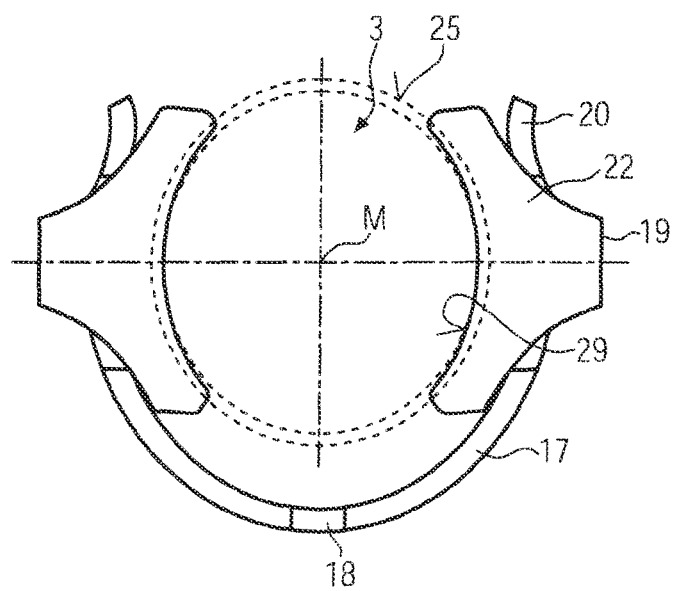
FIG. 3b depicts a plan view of the latching element from FIGS. 1 and 2.

In the enlarged illustration of the latching element 16 in FIGS. 3a and 3b the one-sided opening of the clip element 17 can be clearly seen. The opening is formed on the side situated opposite the guide ridge 18 between the two mounting tips 20, whereby the mounting tips 20, bent outwards, widen the opening for clipping the clip element 17 onto the housing shank 12 in order to facilitate easy mounting without any damage. On their inner side the arc-shaped latching hooks 22 orientated inwards have a radially running face side 29, whereby the curvature of the face side 29 corresponds at least to the radius of the tensioning piston 3 in the region of the tooth tips, i.e. normally the external radius of the tensioning piston 3 in the region without the latching profile 23. The height of the face side 29 corresponds essentially to the length of the tooth space 26 between the abutment flank 27 and the ramp 25 of two adjacent saw teeth 24. To improve the slide-through behavior of the tensioning piston 3 with respect to the latching element 16, as illustrated in FIG. 3b, the radius of the face side 29 can be greater than the outer radius of the tensioning piston 3 or the tips of the saw teeth 24. In this way the central point of the arc-shaped latching hooks 22 is displaced outwards with respect to the central point M of the tensioning piston 3 into an eccentric position, both in the engaged state and also when sliding through.

In the region of the spring arms 19 the clip element 17 has tangentially running shaped sections 30. In conjunction with correspondingly flattened axially running guide sections 31, these flattened shaped sections 30 support the radial anti-twist device of the latching element 16 through the guide ridge 18. As can be seen in FIG. 3b, an oval basic shape of the clip element 17 is produced by the mounting tips 20 which are bent outwards and the flattened shaped sections 30. Depending on the arrangement and shape of the components of the latching element 16 provided on the clip element 17, other basic shapes are also possible. The two spring arms 19 and thus also the latching hooks 22 mounted on them are arranged on oppositely situated sides of the tensioning piston 3 in order to realize as tilt-free force transfer as possible to the latching element 16 and a twist-free movement of the latching element 16 on the housing 1. With a larger number of spring arms 19 or latching hooks 22 they are distributed evenly around the circumference of the tensioning piston 3.

In the following the functioning principle of the illustrated tensioning device is explained in more detail based on FIG. 4. With the inward movement E of the tensioning piston 3 into the piston bore 28 of the housing 1 illustrated in FIG. 4a the inward movement is delimited by abutment of the latching hooks 22 on the face side 13 of the housing 1. When this occurs, principally shear forces, which arise between the abutment flank 27 of the saw tooth 24 and the face side 13 of the housing 1, are generated in the latching hooks 22. The closer to one another the shear surfaces are arranged in the axial direction, the less is the proportion of the bending forces in the latching hooks 22 and thus also the mechanical stress of the latching elements 16. The face side 13 thus forms the rear end-stop of the restraint system and prevents the further axial movement of the latching element 16 against the tensioning direction and also prevents a further engaging movement of the tensioning piston 3 via the spring arms 19, which engage the latching profile 23 of the tensioning piston 3 by means of their latching hooks 22.

In FIG. 4a the latching hooks 22 aligned radially inwards on the spring arms 19 are located in the first tooth space 26 of the tensioning piston 3, whereby the contour of the face side 29 of the latching hooks 22 is matched to the shape of the tooth space 26 for a secure engagement. The first tooth space 26 of the latching profile 23 is here formed between the abutment flank 27 of the securing protrusion 11 and the ramp 25 of the first saw tooth 24 of the latching profile 23. Due to the blocking of the further engaging movement of the tensioning piston 3, with inadequate damping of the tensioning piston 3 by the hydraulic medium provided in the pressure cavity, for example during a pressure drop in the hydraulic system or directly after starting the internal combustion engine, a minimum tension on the timing chain is maintained so that so-called start rattling or jumping of the timing chain is prevented.

Apart from the radial guidance by the guide ridge 18, which is guided in the axial direction in the guide opening 21 between the stop blocks 14, the radial anti-twist device of the latching element 16 is supported by the flat formation of the guide sections 31 on the housing shank 12 and the shaped sections 30 on the annular element 17 which interact with it at the level of the spring arms 19.

In FIG. 4b the restraint system of the tensioning device is illustrated in the forwards displaced state, whereby the upper edge of the clip element 17 in the tensioning direction abuts the stopping faces 15 of the stop blocks 14 facing away from the face side 13. This front end-stop of the latching element 16 is supported by a simultaneous abutment of the guide tips 20 on the surfaces of the securing lugs 8 facing away from the face side 13, which, similarly to the stop blocks 14 adjacent to the face side 13 of the housing 1, protrude radially. With a disengaging force for tensioning the tensioning piston 3 or for tensioning the timing chain which does not exceed the tensioning force of the spring arms 19, the latching hooks 22 fixed in the first tooth space 26 by the tension of the spring arms 19 hold the tensioning piston 3 in the position with respect to the latching element 16 defined by the face sides 29 of the latching hooks 22 in the tooth spaces 26.

This position marks the upper limit of the free working range A, in which the tensioning piston 3 can move freely under normal operating conditions without the tensioning piston 3 moving relative to the latching element 16. Only smaller relative movements within the scope of normal tolerances can occur between the latching element 16 and the tensioning piston 3. The lower limit of the free working range A is defined by the abutment of the latching element 16 on the face side 13 or another rear end-stop of the restraint system.

When the abutment of the latching element 16 at the front end-stop shown in FIG. 4b, i.e. on the stop blocks 14, exceeds the spring force of the spring arms 19 acting on the tensioning piston 3, for example due to lengthening of the timing chain due to wear, the tensioning piston 3 extends further out of the piston bore 28, whereby the latching hooks 22 are released from the tooth spaces 26 and slide along the ramp 25 on the tensioning piston 3 against the tensioning direction S. Due to the increasing diameter of the ramp 25 the tension from the spring arms 19 acting on the tensioning piston 3 via the latching hooks 22 increases accordingly. If the excess of the tensioning force of the tensioning piston 3 is not sufficient to overcome the increasing tension along the ramp 25 of the saw teeth 24, the latching element 16 is pushed back again into its initial position with respect to the tensioning piston 3 during the next inward movement of the tensioning piston 3. This relative movement between the latching element 16 and the tensioning piston 3 or a movement of the latching element 16 only in the upper region of the free working range A is repeated as long as the excess between the tensioning force and the tension due to the spring arms 19 is sufficient to allow the latching hooks 22 to slide over the complete ramp 25 of the saw tooth 24 into the next tooth space 26. Then the latching element 16 together with the tensioning piston 3 fixed in the next tooth space 26 by the spring arms 19 can move again along the complete free working range A.

Figure 5A:
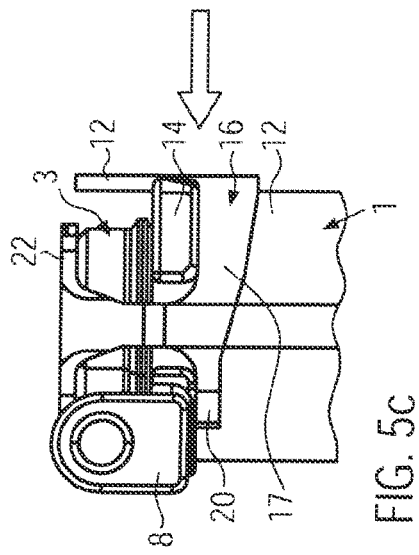
FIGS. 5a-f depict side views of the components of the restraint system from FIG. 1 during various assembly steps.
Figure 5D:
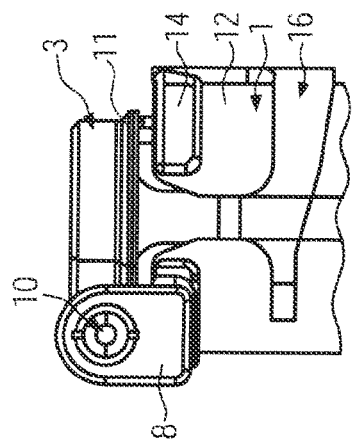
Figure 5B:
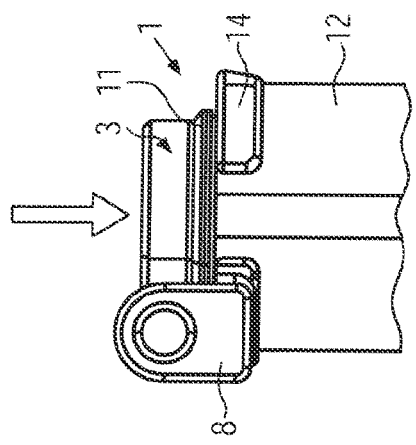
Figure 5E:
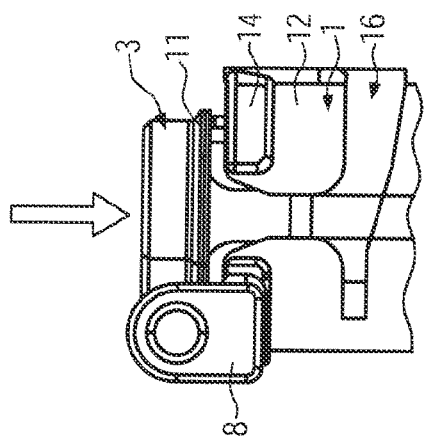
Figure 5C:
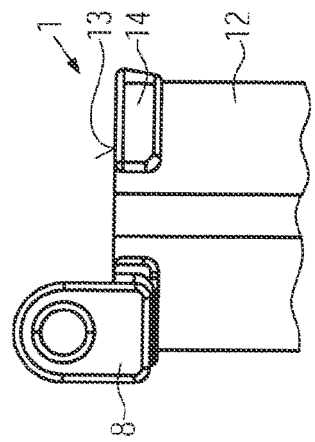
Figure 5F:
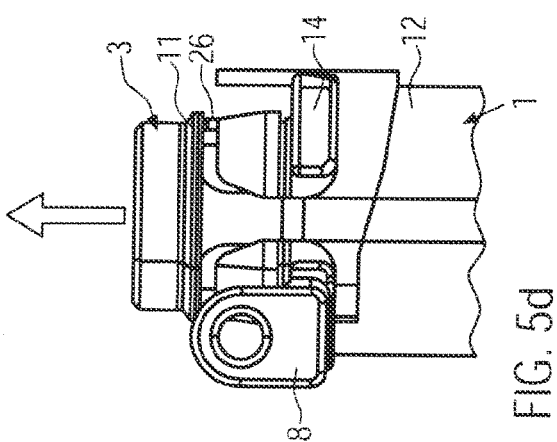

In the following the assembly of the restraint system of a tensioning device and of an additional transport securing device is explained in detail based on FIGS. 5a to 5f. Here FIG. 5a illustrates the housing 1 of the tensioning device on which the securing hooks 8 and the stop blocks 14 are arranged on the face side 13. The housing shank 12 extends below the face side 13 or below the securing hooks 8 and the stop blocks 14. As shown in FIG. 5b, at the start of the assembly the tensioning piston 3 is in most cases completely inserted into the piston bore 28 against the tension force of a compression spring arranged in the housing bore 28 of the housing 1. Here only the securing protrusion 11 on the tensioning end of the tensioning piston 3 above the face side 13 remains outside of the housing 1. In the next assembly step FIG. 5c illustrates the sideward pushing on of the latching element 16, whereby the mounting tips 20, which are bent outwards, easily enable the clip element 17 to be pushed on over the housing shank 12. Here, the latching hooks 22 come to rest above the completely inserted tensioning piston 3, whereas the guide ridge 18 is positioned in the guide opening 21 between the two sideward protruding stop blocks 14. Then the force acting on the tensioning piston 3 from outside is reduced or completely removed so that the tensioning piston 3 is moved out of the piston bore 28 by the tension of the compression spring until, as shown in FIG. 5d, the latching hooks 22 of the latching element 16 engage beyond the securing protrusion 11 in the first tooth space 26 of the latching profile 23. Optionally, the outward movement of the tensioning piston 3 can be supported by an additional force applied via the pressure cavity between the tensioning piston 3 and the piston bore 28, for example by means of a hydraulic medium. In the next assembly step, FIG. 5e, the tensioning piston 3 is again moved into the piston bore 28 by an externally applied force. During this movement the latching element 16 coupled to the latching profile 23 via the latching hooks 22 also moves on the housing shank 12 of the housing 1. The inward movement of the tensioning piston 3 is in this assembly step limited by the end-stop of the latching hooks 22 on the face side 13 of the housing 1. Finally, as illustrated in FIG. 5f, the position of the tensioning piston 3 in the housing bore 28 and the associated position of the latching element 16 on the housing shank 12 are fixed by the securing bolt 10, which is passed through the securing sleeves 9 of the two securing lugs 8 in order to secure the tensioning piston 3 and the latching element 16 located on it in their (transport) positions by means of the overlapping with the securing protrusion 11 on the tensioning piston 3.

Due to the movable arrangement of the latching element 16 on the housing shank 12, or on the housing 1 itself, in conjunction with the anti-twist protection due to the guide ridge 18 and the guide sections 31 on the housing shank 12, there are no opposing clamping or frictional forces of the restraint system in the free working range A of the tensioning movement S and the inward movement E of the tensioning piston 3. The tensioning device with restraint system thus facilitates over the free working range A an almost resistance-free movement of the tensioning piston 3 in the piston bore 28 of the housing 1, by means of which tensioning behavior corresponding to conventional tensioning devices without restraint system is facilitated. Furthermore, via the tensioning of the spring arms 19 and the relatively narrow face sides 29 of the latching hooks 22, the tensioning device facilitates a relatively close arrangement of the saw teeth 24 on the latching profile 23 and thus a simple low-wear latching device which can be easily adjusted to the requirements of the restraint system The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A tensioning device for a flexible driving means, comprising:
    a housing;
    a tensioning piston guided in a piston bore of the housing; and
    a latching element arranged outside on the housing,
    wherein the tensioning piston is provided with a latching profile on the front section of the tensioning piston in a tensioning direction,
    wherein the latching element has at least one section protruding over the housing in the tensioning direction and engaging the latching profile of the tensioning piston outside of the housing,
    wherein the latching element has two spring arms, protruding over the housing in the tensioning direction, formed with latching hooks aligned radially inwards, and
    wherein the latching element for the delimitation of the free working range between a front end-stop and a rear end-stop in and against the tensioning direction is arranged movably on the housing, and
    wherein the latching element has a guide ridge protruding from the latching element in the tensioning direction and extending coaxial with the longitudinal direction of the tensioning piston, the guide ridge providing an anti-twist function under operating conditions.

2. The tensioning device according to claim 1, wherein the latching element is formed as a sectionally open, flexible clip element in spring steel.

3. The tensioning device according to claim 1, wherein the front end-stop has at least one stop block and the stop block radially protrudes with respect to the housing adjacent to the face side of the housing.

4. The tensioning device according to claim 3, wherein the stop block also forms the rear end-stop.

5. The tensioning device according to claim 1, wherein the housing has a housing shank on which the latching element is movably arranged.

6. The tensioning device according to claim 1, wherein the latching profile on the tensioning piston is formed as a circumferential sawtooth profile.

7. The tensioning device according to claim 6, wherein the face side of a latching hook aligned radially inwards on the spring arm has a radius to the longitudinal axis of the tensioning piston which is greater than the outer radius of the tensioning piston.

8. Use of a housing with a piston bore and a region for a latching element, which is movably arranged on the housing from outside between a front end-stop and a rear end-stop in the tensioning device according to claim 1.

9. Use of a housing for the tensioning device according to claim 1, comprising a piston bore and a region for a latching element, which is arranged on the housing from outside between a front end-stop and a rear end-stop, in a tensioning device without a latching element arranged on the housing from outside, wherein a tensioning piston of the tensioning device is formed with or without a latching profile.

10. The tensioning device according to claim 1, wherein the flexible driving means is a timing chain of an internal combustion engine.

11. A tensioning device for a flexible driving means, comprising:
- a housing;
- a tensioning piston guided in a piston bore of the housing; and
- a latching element arranged outside on the housing,
- wherein the tensioning piston is provided with a latching profile on the front section of the tensioning piston in a tensioning direction,
- wherein the latching element has at least one section protruding over the housing in the tensioning direction and engaging the latching profile of the tensioning piston outside of the housing,
- wherein the latching element has two spring arms, protruding over the housing in the tensioning direction, formed with latching hooks aligned radially inwards, and
- wherein the latching element for the delimitation of the free working range between a front end-stop and a rear end-stop in and against the tensioning direction is arranged movably on the housing, and
- wherein the housing has at least one guide section arranged on the housing in a longitudinal direction, the guide section having a guide opening provided in an axial direction parallel to the longitudinal direction of the tensioning piston, the guide opening providing an anti-twist function under operating conditions.

* * * * *